United States Patent [19]
Küsters et al.

[11] Patent Number: 5,919,121
[45] Date of Patent: Jul. 6, 1999

[54] ROLLER WITH CONTROLLABLE DEFLECTION

[75] Inventors: Karl-Heinz Küsters, Krefeld; Wolfgang Mark, Meerbusch, both of Germany

[73] Assignee: Eduard Kusters Maschinenfabrik GmbH & Co. KG, Krefeld, Germany

[21] Appl. No.: 08/973,354

[22] PCT Filed: Jun. 4, 1996

[86] PCT No.: PCT/DE96/00978

§ 371 Date: Dec. 1, 1997

§ 102(e) Date: Dec. 1, 1997

[87] PCT Pub. No.: WO97/00355

PCT Pub. Date: Jan. 3, 1997

[30] Foreign Application Priority Data

Jun. 16, 1995 [DE] Germany ............ 195 21 860

[51] Int. Cl.$^6$ .................................... B21B 27/00
[52] U.S. Cl. ................... 492/7; 492/16; 492/46
[58] Field of Search .............. 492/7, 46, 16, 492/47

[56] References Cited

U.S. PATENT DOCUMENTS

| | | |
|---|---|---|
| 1,432,645 | 10/1922 | Vaughan . |
| 2,395,915 | 3/1946 | Specht . |
| 3,119,324 | 1/1964 | Justus . |
| 3,587,152 | 6/1971 | Hold ........................... 29/116 |
| 3,802,044 | 4/1974 | Spillmann et al . |
| 3,932,921 | 1/1976 | Biondetti . |
| 3,997,953 | 12/1976 | Christ et al. . |
| 4,047,273 | 9/1977 | Biondetti . |
| 4,090,282 | 5/1978 | Lehmann . |
| 4,292,716 | 10/1981 | Marchioro . |
| 4,307,501 | 12/1981 | Ahrweiler ................ 29/113 AD |
| 4,747,195 | 5/1988 | Snellman ....................... 492/7 |
| 4,757,582 | 7/1988 | Verkasalo .................. 29/116.2 |
| 4,919,761 | 4/1990 | Schiel et al. . |
| 4,984,343 | 1/1991 | Schrörs ...................... 29/116.2 |
| 5,152,041 | 10/1992 | Link et al. . |
| 5,534,117 | 7/1996 | Roerig ........................... 492/7 |
| 5,599,263 | 2/1997 | Haiko et al. ................. 492/7 |
| 5,645,517 | 7/1997 | Stotz ............................ 492/7 |
| 5,662,571 | 9/1997 | Brandiser et al. ........... 492/7 |

*Primary Examiner*—S. Thomas Hughes
*Assistant Examiner*—Marc W. Butler
*Attorney, Agent, or Firm*—Kenyon & Kenyon

[57] ABSTRACT

A roll having bending control has a rotating hollow roll and a non-rotatable crossbeam penetrating the hollow roll lengthwise. Arranged on the crossbeam in an axially parallel row, closely following one another, are supporting elements which can be actuated independently of one another by fluid pressurized medium. Supply lines are attached via angle units to a bar-type carrier which is fastened to the crossbeam by means of screws that can be manipulated from the outside. The screws have longitudinal bore holes through which the respective supply line is directly connected to the respective supporting element.

15 Claims, 4 Drawing Sheets

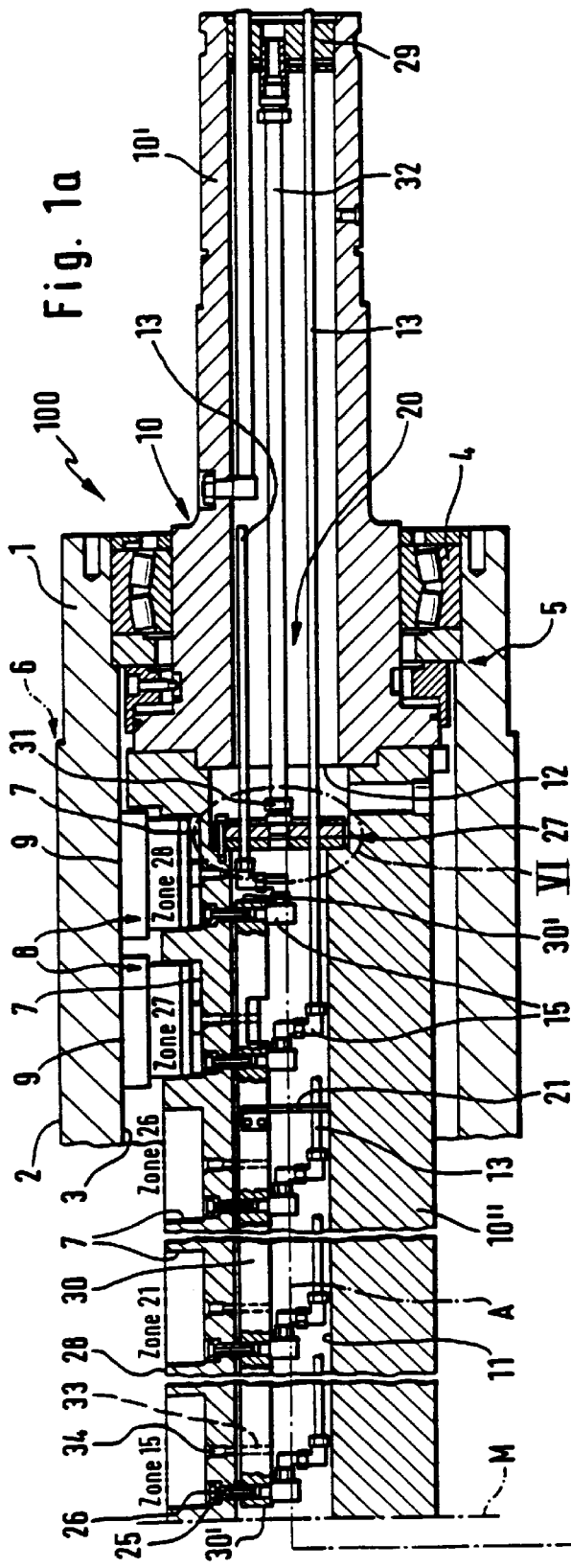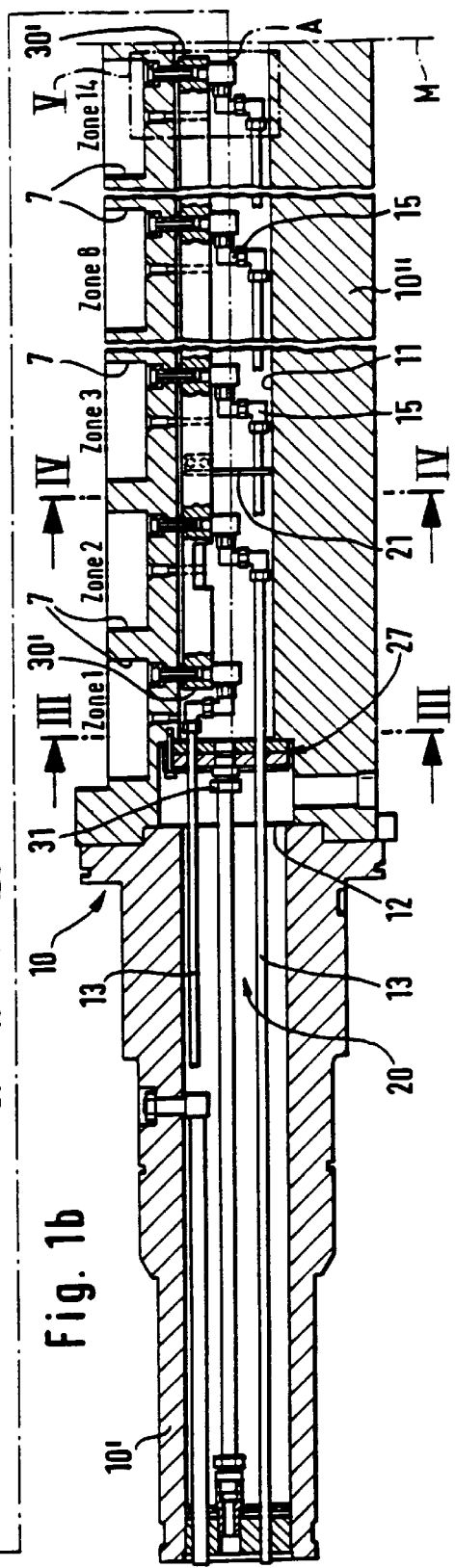

ROLLER WITH CONTROLLABLE DEFLECTION

BACKGROUND OF THE INVENTION

The invention relates to a roll of the type having bending control, in which a hollow rotating roll having an outer working surface can be bent. The roll is provided with a non-rotatable crossbeam which penetrates the roll lengthwise, and is supported at its ends against an outer bracing element. The crossbeam is offset with a radial clearance all around from the inner circumference of the hollow rotating roll. Mounted on the crossbeam is a series or row of supporting elements that can be actuated by a fluid pressurized medium, fed by a plurality of supply lines running from the ends of crossbeam through a central longitudinal recess in the crossbeam. These enable the pressurization by the pressurized medium of individual or a plurality of supporting elements jointly connected groupwise to a supply line. The supply lines are being combined to make a supply unit that forms an assembly closed upon itself and which, as an entity, is insertable into or removable from the longitudinal recess of the crossbeam.

In rolls of this general type, a row of approximately twenty to eighty supporting elements are usually distributed over the length of the roll, usually on the side of the roll nip. These supporting elements are constructed like piston/cylinder units and abut against the inner circumference of the hollow roll, with bearing pockets being formed in the contact surface which exert a hydrostatic pressure against the inner circumference of the hollow roll, and from which pressurized fluid constantly escapes over their boundaries, so that a load-bearing liquid film is maintained which prevents a metallic contact between the supporting element and the inner circumference of the hollow roll.

During operation, these supporting elements must be supplied with at least one fluid pressurized medium. This medium usually is a pressurized fluid, in particular a pressurized oil, which may also be used as a heat-carrier medium. However, it is also possible to use gas-driven, and especially air-driven supporting elements.

Examples of such rolls are described in the following patents: U.S. Pat. No. 3,119,324, DE 22 30 139 B2, U.S. Pat. No. 2,395,915, DE 36 40 902 C2 and DE 38 20 974 C2, the contents of which are incorporated herein by reference for these teachings.

In many cases, the supporting elements are combined to form a plurality of groups which receive the fluid pressurized medium, at a common pressure, and thus require only one supply line. The smaller the groups, the more supply lines must be present. When, in the extreme case, each supporting element is to be acted upon separately in order to influence the line force in a particularly sensitive manner, at least just as many supply lines must be present as supporting elements. Since the supply lines cannot have less than a certain minimum cross-section, because the supporting elements need a certain throughput volume for their proper operation, especially for the maintenance of the separating liquid film, the feeding of the pressurized medium to the individual supporting elements or groups of supporting elements presents a problem, because only a very limited cross-section is available for this purpose. The crossbeam, which sags inside the hollow roll under the line load given by the line force, must not be substantially weakened in its bearing cross-section if the roll is to be able to generate higher line pressures.

A first possibility for supplying the supporting elements is the subject matter of the German patent 24 07 510 B2, in which, at the location of each supporting element, a control valve is provided, by means of which an actuating pressure adjusted for each supporting element is formed, by reduction, from the pressurized fluid introduced through a central main channel. For example, the respective valve is remotely pneumatically operated. Thus, correspondingly many remote-control lines must again be accommodated, as well. The arrangement of a multitude of valves is costly, and the weakening of the cross-section is not inconsiderable. A particular disadvantage, moreover, is that the valves are in the roll, so that in the event of a malfunction of even one valve, the entire roll must be dismantled.

In other specific embodiments, the valve arrangement is provided outside of the roll. In DE 26 57 061 C2 and DE 25 50 270 C3, one or a plurality of supply lines are formed, in the manner that adjustable compartmentalizations are provided in the longitudinal recess of the crossbeam, and the region between the individual compartmentalizations is supplied with pressurized medium through corresponding bore holes in the crossbeam or concentric pipe arrangements. The pressurized medium is then fed to the group of supporting elements, whose supply lines in the region between the respective compartmentalizations open through into the longitudinal recess. For higher numbers of supporting elements, or groups of supporting elements to be supplied separately, as occur, for example, in the roll according to the German utility model patent 93 14 568, such arrangements are unsuitable. In particular, the separation at the individual compartmentalizations is suitable only for relatively low pressures due to the limited serviceability of the sealing devices which must survive insertion and extraction.

This disadvantage is also true for the specific embodiment according to the German patent 28 47 029 B1, in which the supply lines into the regions between the individual compartmentalizations are formed by pipe lines. The pipe lines support the compartmentalizations. The entirety of pipe lines and compartmentalizations can be extracted as a unit out of the longitudinal recess of the crossbeam.

Thus, one of the problems to which the invention is directed is to provide a supply unit of this general type which is suitable for a greater number of supporting elements or groups of supporting elements to be supplied separately, and which can also be used at higher pressures.

SUMMARY OF THE INVENTION

This problem is solved by providing a hollow rotating roll of the type having bending control, in which the roll is provided with a non-rotatable crossbeam which penetrates the roll lengthwise, and is supported at its ends against an outer bracing element. The crossbeam is offset with a radial clearance all around from the inner circumference of the hollow rotating roll. Mounted on the crossbeam is a series or row of supporting elements that can be actuated by a fluid pressurized medium, fed by a plurality of supply lines running from the ends of crossbeam through a central longitudinal recess in the crossbeam. These enable the pressurization by the pressurized medium of individual or a plurality of supporting elements jointly connected groupwise to a supply line. The supply lines are being combined to make a supply unit that forms an assembly closed upon itself and which, as an entity, is insertable into or removable from the longitudinal recess of the crossbeam. Each supporting element is connected to its associated supply line via a connecting piece which forms a connecting channel running from the longitudinal recess of the crossbeam to the respective supporting element, and which can be manipulated from outside the crossbeam to produce or loosen the connection.

Thus, sections of the longitudinal recess are no longer subdivided by compartmentalizations needing sealing, but rather each supporting element or each group of supporting elements is connected directly to a supply line. And so that a pressure-tight connection results at each of the supporting elements arranged on the outside of the crossbeam, the connecting pieces are provided which are able to be manipulated from the outside. Thus, the pressurized medium is conducted to the supporting element in a closed line, which permits operation under virtually any pressures. After loosening all the connecting pieces, the entirety of supply lines can be extracted as a whole from the longitudinal recess of the crossbeam.

In a further aspect of the invention, an elongated, axially-parallel carrier is provided which occupies only a small part of the cross-section of the longitudinal recess of the crossbeam, and abuts against the wall of the longitudinal recess facing the supporting elements. It has through-holes at the locations of connecting pieces into which angle connection pieces are inserted from the inner side of longitudinal recess, the ends of the supply lines opening through into the angle connection pieces. This carrier may thus be viewed as the backbone of the supply unit as it retains the ends of the supply lines in a fixed position by way of the angle connection pieces. In addition, the carrier allows the simultaneous positioning of all the connecting points of the connecting pieces, which can thus be set from outside of the crossbeam, without having to be repositioned from the poorly accessible interior of the crossbeam.

Expediently, the carrier has a rectangular cross-section, so that planar, as well as bore-hole and mounting surfaces situated in the right angle are present.

One specific embodiment of the connecting pieces which is simple to implement are longitudinally-bored screws which engage from the outside of the crossbeam with threaded portions of the through holes in the carrier.

In a further embodiment of the invention, the mouths of supply lines into the angle connection pieces lie on a common plane of alignment A. The supply lines run, with a clearance, radially outside of this line A and are bent to right angles just before the respective angle connection piece into line of alignment A. This arrangement, because of the identically arranged bore holes and identical component parts, allows efficient manufacture of the supply unit, and is space-saving. In one further advantageous specific embodiment, the bend to right angles is formed by angle units which can all be identical to one another if the supply lines are arranged on a divided circle whose center point is situated approximately in the center of the longitudinal recess, because then the radial distance from the supply lines to the mouth is identical for all the supply lines.

To stabilize the bundle of supply lines, which correspond in their length to the length of the roll, holding disks are advisable. In particular, at at least one location of the supply unit, a holding disk is provided which has bore holes for supply lines. The holding disk is joined to the carrier and extends transversely with respect to the carrier.

It can be expedient to seal the longitudinal recess of the crossbeam at the ends of said crossbeam by means of cover plates having bore holes for the supply lines, which can have connections for the feeding and discharge of fluid medium into and out of the longitudinal recess.

This is especially relevant for a particular type of supporting element, in which a first pressurized medium is used to generate the hydrostatic pressure in the bearing pockets and, while maintaining a load-bearing film of pressurized medium at the edges of the bearing pockets, constantly escapes via said edges (DE 38 20 974 C2). The pressing of the supporting elements against the inner circumference of the hollow roll and the adjustment of the contact pressure, and thus of the flow of line force, is not effected by this pressurized medium, but rather by way of a separate pressurized medium which is conducted into a closed cylinder chamber of the supporting element, and there exerts a hydrostatic contact pressure which can be controlled in the desired manner. The conveyance of the separate pressurized medium to the cylinder chambers requires a second feed path. In this case, additional radial channels run from the longitudinal chamber, sealed at the ends by the cover plates provided with connections, to the supporting elements which bring forward the cylinder-chamber medium. In this case, the longitudinal recess has not only the function of accommodating the supply lines, but also has a liquid-conducting function itself.

Rolls of the type in question can have lengths of up to ten meters. A bundle of relatively thin pipe lines of such a length can be difficult to handle. For this reason, it can be advisable to insert supply units from both ends of the crossbeam into the longitudinal recess of said crossbeam, whereby the handling length is halved, and furthermore, the number of separate supply lines able to be accommodated in a specific cross-section of the longitudinal recess is doubled.

BRIEF DESCRIPTION OF THE DRAWINGS

The Drawings show an exemplary embodiment of the invention.

FIGS. 1a and 1b together show a longitudinal cross-sectional view taken through the axis of a roll constructed according to the principles of the invention;

FIG. 6 shows an enlarged view of a cover plate corresponding to the area bordered by a broken line and designated with VI in FIG. 1a.

DETAILED DESCRIPTION

Figure 2:
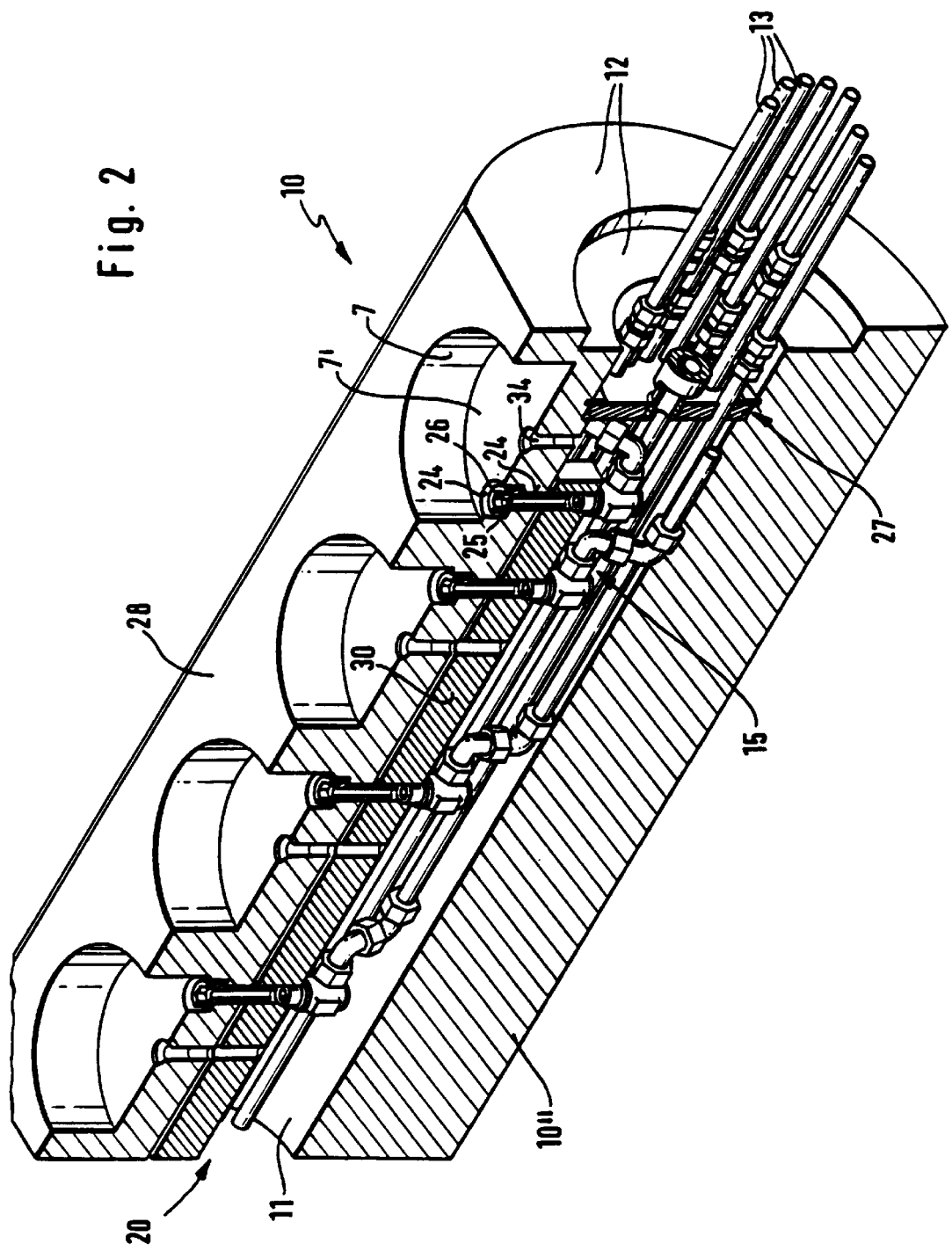
FIG. 2 is a perspective partial view of the crossbeam of the roll, cut vertically along its longitudinal axis, with a supply unit according to the invention.

In FIGS. 1a and 1b, roll 100 comprises a rotating hollow roll 1 whose outer circumferentially extending surface forms the working roll circumference 2, and within which is a smooth, closed, cylindrical, inner circumferentially extending surface 3. The hollow roll is penetrated lengthwise by a bar-shaped crossbeam 10 which projects from hollow roll 1 at ends 10', and which is supported there in a roll frame, in the rocker arms of a calender, or in a similar support device. The projecting ends 10' form the journals of the roll 100. In the exemplary embodiment, they are produced as separate parts which are joined along a joining surface 12 situated near the ends of roll 100 to the one-piece mid-section 10" of crossbeam 10.

Of the hollow roll 1, only the right end represented in FIG. 1a is drawn; naturally, however, hollow roll 1 extends over the entire width of the working area. At the end shown in FIG. 1a, hollow roll 1 is rotationally supported by way of roller bearing 4 on crossbeam 10. On the inside of roller bearing 4, a bearing ring seal 5 is provided which prevents the emergence of leakage oil from the interior of hollow roll 1, axially outwardly. On the side of roll nip 6 situated at the top of FIG. 1a, cylindrical recesses 7 are provided in crossbeam 10 which have a radial axis orthogonal with respect to the axis of crossbeam 10, and within each of which an identical supporting element 8 is radially movable like a piston/cylinder unit. The supporting elements 8 each have outer contact surfaces 9 that abut against the inner circumferential surface 3 of the hollow roll 1, contact surfaces 9 having hydrostatic bearing pockets. A fluid pressurized medium—in the exemplary embodiment, hydraulic pressurized fluid—is fed to the supporting elements 8 in a manner described below. Under the pressure of this pressurized fluid, supporting elements 8 become positioned against inner circumference 3 of hollow roll 1, and press it upwardly as shown in FIG. 1a, thereby producing a line force in roll nip 6. Crossbeam 10 sags somewhat downwardly under the opposing force of supporting elements 8 within hollow roll 1 according to FIG. 1a. Hence, to avoid contact between the inner circumferential surface 3 of the roll 1 and the crossbeam 10, there is a clearance provided around the cross beam 10.

In the illustrated embodiment, supporting elements 8 are closely arranged. Over the length of the roll, twenty-eight supporting elements 8 follow one after the other in an axially parallel row situated on the side of roll nip 6.

In the exemplary embodiment, all twenty-eight supporting elements 8 must each be supplied individually with a separately controllable pressurized fluid for the bearing pockets. This is accomplished by individual supply lines 13 in the form of pipes which run through a central longitudinal recess 11 within crossbeam 10. Supply lines 13 are combined into two identical supply units, which in FIG. 1a and 1b, respectively, are designated with reference numeral 20, and which extend from the respective end of the crossbeam 10 to shortly before the median plane N of crossbeam 10, median plane M being transverse to the axis.

Figure 3:
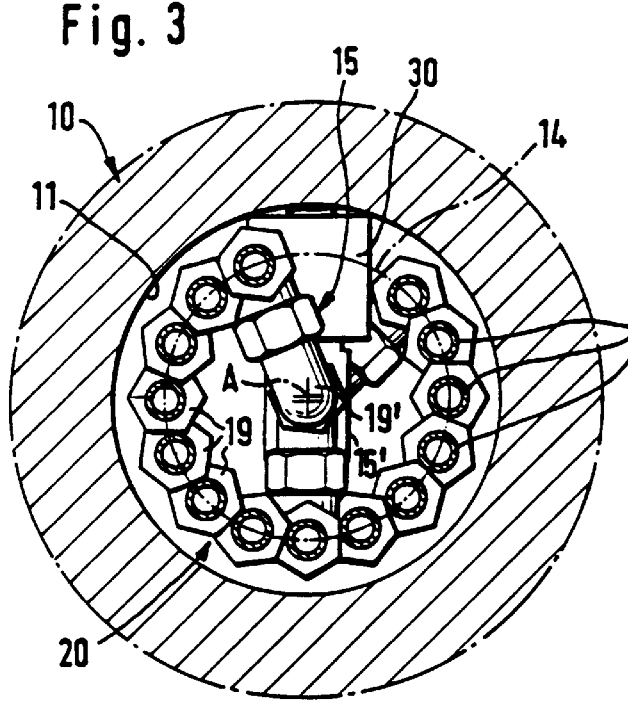
FIGS. 3 and 4 show cross-sections taken along lines III—III or IV—IV in FIG. 1b in enlarged scale.
Figure 4:
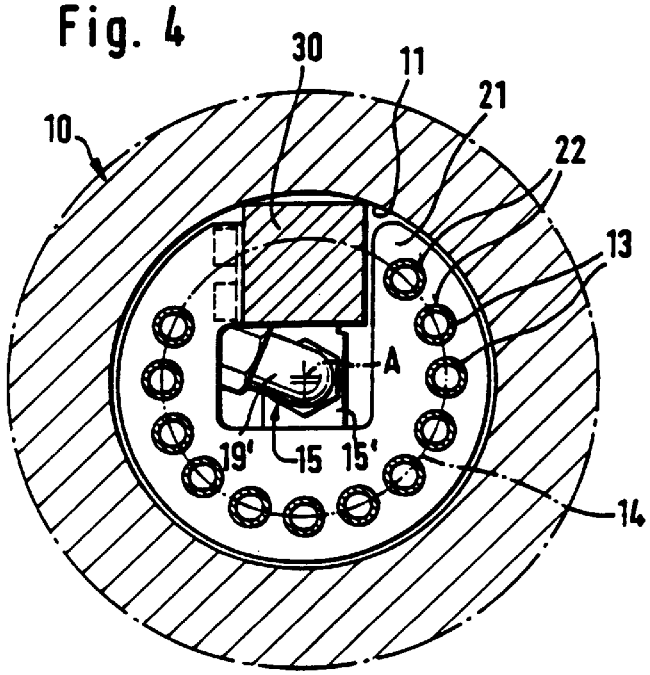

The individual supply lines 13 are arranged within longitudinal recess 11 on a divided circle 14 around longitudinal axis A of crossbeam 10, as can be seen in FIGS. 3 and 4. Each supply line 13 runs to the supporting element 8 allocated to it and opens through there into an angle connection piece 15 that comprises two single angle units 19, 19' put together in an S-shape, and produces a right angle bend in the supply line path by a distance K (FIG. 5), corresponding to the radius of divided circle 14. Angle connection pieces 15 are inserted with a connecting pin 16, provided at end section 15', into radial bore holes 17 of a carrier 30. The carrier 30 is made of a profile bar having a quadrate cross-section that abuts with one side against the upper side boundary of the longitudinal recess 11 (FIG. 4), and extends from the respective end of mid-section 10" of crossbeam 10 to approximately its center. On one hand, carrier 30 should be somewhat flexurally stiff, but on the other hand, should not occupy too much of the space of the cross-section of the longitudinal recess 11. It is prefereable that the maximum cross-sectional dimension of the carrier can lie between a quarter and half the diameter of the longitudinal recess 11. In the exemplary embodiment, the edge length of the quadrate cross-section is approximately a third of the diameter. The front-side end faces of the two carriers 30 are designated in FIG. 1a and 1b with 30'. The offset end areas 18 of the flow route of supply lines 13 in the respective angle connection piece 15 (FIG. 5) all lie on a common line of alignment coinciding axially parallel with axis A, so that the end sections 15' of angle connection pieces 15 effecting the connection to the carrier can all be identically oriented with respect to carrier 30. As is shown in FIGS. 2 and 3, the angle pieces 19' attached at the respective end section 15' are at different angles in a plane transverse to the axis, in order to lead the respective supply line 13 to the axis A forming the common line of alignment.

Thus, all the supply lines 13 of a supply unit 20 are interconnected by a single carrier 30 which forms the backbone of the bundle of supply lines 13, made of pipes, surrounded by the respective supply unit 20, and whose inner ends are positioned at defined locations. Along crossbeam 10, spaced according to the objective, screwed-on holding disks 21 can be provided on carrier 30 which extend transversely to the axis and which have bore holes 22 for supporting and permitting the passage through of supply lines 13 in the correct arrangement. In this manner, carrier 30, with supply lines 13 that are secured to it and fixed in position by holding disks 21, forms a bar-shaped structural supply unit 20 which is easy to manipulate, as it is insertable as a single, handleable assembly into crossbeam 10 from the end of said crossbeam.

The crossbeam 10 has a flattened upper side 28 facing the roll nip 6. Located along side 28 is a row of cylindrical recesses 7, each of which has a bottom 7'. These recesses are intended for accommodating a supporting element 8. A radial bore hole 24 which has an offset 23 is also provided in the crossbeam 10 for each of these recesses and is aligned with one of bore holes 17 in the carrier. A cap screw 25 having a longitudinal bore hole 26 passing through it is screwed into bore hole 24. On one hand, screw 25 secures carrier 30 at the upper boundary of longitudinal recess 11, and, on the other hand, forms the flow route for the pressurized fluid which, in this way, can overflow from line 13 in a closed course into the interior of recess 7. Since bore holes 17 and 24 are coordinate with each other in their position, if one bore hole pair 17, 24 is made to coincide, the correct positioning for all the other bore holes 17 is also found at the same time. The screws 25, which serve as mechanical connecting pieces and also provide a flow path, can be screwed into each individual recess 7 from outside of crossbeam 10 prior to the time at which the hollow roll 1 is slipped on.

Figure 6:
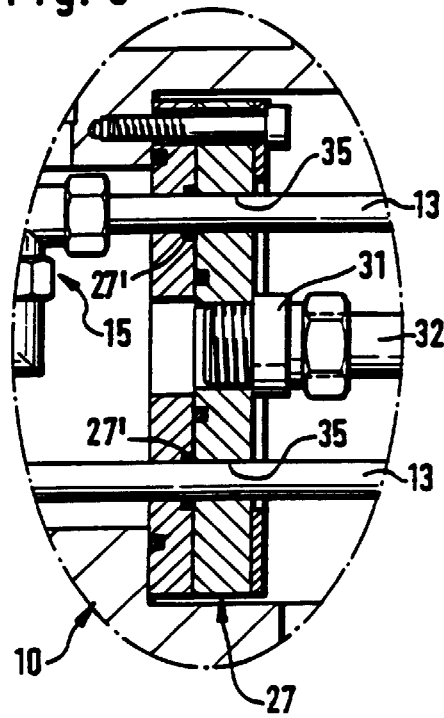

Longitudinal recess 11, in mid-section 10" of crossbeam 10, is sealed off outwardly at its ends by end plates 27, through which supply lines 13 are passed through in corresponding bore holes 35 (FIG. 6). End plates 27 are double plates, so that on the sides of the individual plates facing each other, sealing devices 27' can be mounted at the edges of bore holes 35. Supply lines 13 go outwardly through end pieces 10' of crossbeam 10 and emerge at an outer end block 29 penetrated by them.

Provided at end plates 27 are connections 31 for pressurized fluid, through which longitudinal recess 11 can be filled with pressurized fluid. This is also the reason that supply lines 13 must be sealed at end plates 27. Connections 31 are joined to end block 29 by way of connecting pipes 32 corresponding in length to end pieces 10'.

Figure 5:
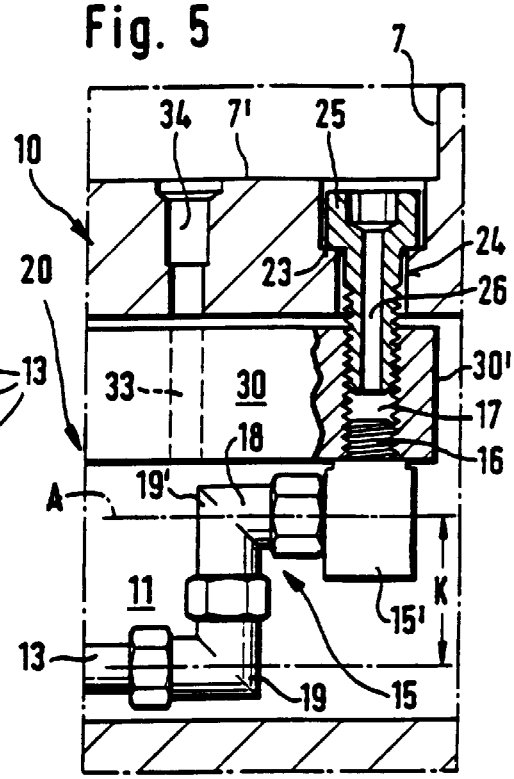
FIG. 5 shows an enlarged partial view of an angle connection piece corresponding to the area bordered by a broken line and designated with V in FIG. 1b.
Figure 7:
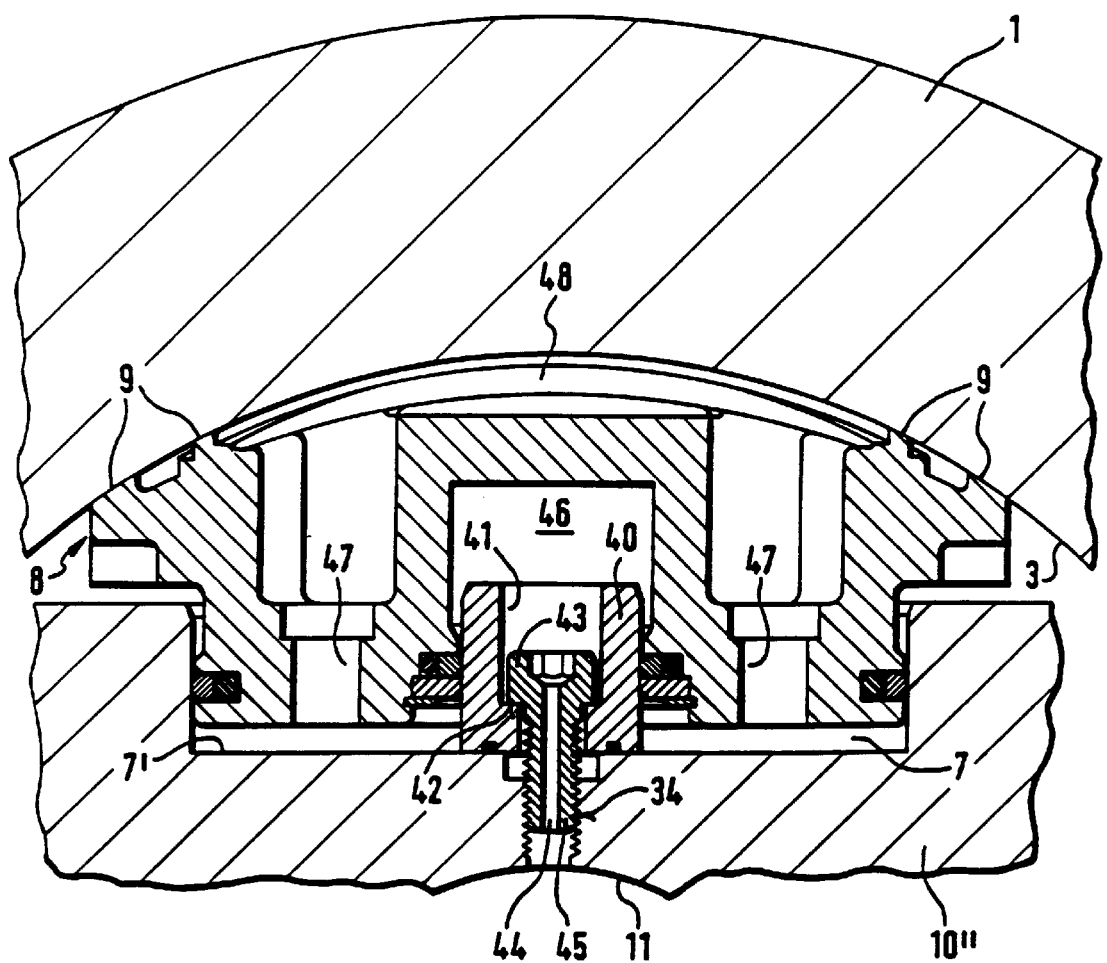
FIG. 7 shows a cross-section taken through the center of a single supporting element, transverse to the axis of the roll.

The pressurized fluid in longitudinal recess 11 is fed to the respective supporting element 8 via aligned bore holes 33,34 penetrating carrier 30 and bottom 7', respectively (FIG. 5). Referring now to FIG. 7, this is accomplished by a piston 40 having a central bore hole 41 with a shoulder 42, upon which is secured head 43 of a cap screw 45 that is provided with a through-hole 44 and is screwed into bore hole 34, and by means of which piston 40 is secured on bottom 7' of recess 7. Piston 40 engages with an inner cylinder chamber 46 of supporting element 8 which is open toward piston 40, but is otherwise closed.

The area of recess 7 remaining between the bottom side of supporting element 8 and bottom 7' of said recess 7 is connected via passages 47 which are free of chokes—i.e. they have a large cross-section—to the bearing pocket 48 which is formed at the supporting-element contact surface 9 facing the inner circumferential surface 3 of the hollow roll 1, and in which the hydrostatic pressure acts against inner circumference 3. The pressurized fluid needed for this purpose is supplied to recesses 7 via the connecting pieces or cap screws 25 (not shown in FIG. 7) that are fed by individual supply lines 13.

The pressure prevailing in closed cylinder chamber 46 presses the respective supporting element 8 against inner circumference 3 of hollow roll 1. The pressurized fluid necessary for this reaches cylinder chamber 46 from longitudinal recess 11 of crossbeam 10 via bore holes 33, 34 and piston 40. Thus, the pressure is equal in cylinder chambers 46 for all supporting elements 8 and corresponds to the pressure in the longitudinal recess. The pressure is effected against all the supporting elements 8 with equal force.

However, this is a feature of the exemplary embodiment. It would be just as possible to connect cylinder chambers 46 to the supply lines, or to supply both the cylinder chambers 46 and bearing pockets 48 via supply lines which are combined in the manner according to the invention to form supply units.

What is claimed is:

1. A roll assembly for providing bending control, comprising:

a hollow roll having an outer working surface, an inner surface, and a longitudinally extending axis of rotation about which the roll is rotatable;

a non-rotatable crossbeam which penetrates the hollow roll lengthwise and which is spaced from the inner surface of the hollow roll, the crossbeam further comprising a longitudinally extending recess and ends at which the crossbeam is supported and braced against an outer bracing element;

a plurality of supporting elements that are mounted in a row along the crossbeam, which can be actuated by a pressurized fluid medium;

a supply unit comprising a self contained assembly that is insertable into or removable from the longitudinal recess of the crossbeam, said self contained assembly comprising a plurality of supply lines, extending inwardly from the ends of crossbeam through the longitudinal recess of said crossbeam, wherein the supply lines are connectable to the plurality of supporting elements so that they feed pressurized fluid to them; and a connecting piece for connecting each supporting element to an associated supply line, the connecting piece forming a connecting channel running from the longitudinal recess of the crossbeam to a respective supporting element, and wherein the connecting piece can be manipulated from outside of crossbeam to produce or loosen the connection between the supply unit and the crossbeam.

2. A roll as set forth in claim 1, wherein each supporting element is pressurized by a single, individually controllable supply line.

3. A roll as set forth in claim 1, wherein groups of supporting elements are fed pressurized fluid by a common supply line.

4. A roll as set forth in claim 1, further comprising:

a plurality of angle connection pieces;

an elongated carrier extending generally parallel to the axis of the hollow roll, said carrier being located within the longitudinal recess of the crossbeam such that it occupies only a portion of cross-sectional space provided by the longitudinal recess, said carrier abutting against an inner wall of the longitudinal recess of the crossbeam, and being oriented within the crossbeam so as to face the plurality of supporting elements;

said carrier further having through-holes at the locations of the connecting pieces into which the angle connection pieces are inserted from an inner side of the longitudinal recess, wherein the ends of the supply lines lead into said angle connection pieces.

5. A roll as set forth in claim 4, wherein the carrier has an essentially rectangular cross-section.

6. A roll as set forth in claim 4, wherein the through-holes are at least partially threaded, and the connecting pieces are longitudinally-bored screws that engage from outside of the crossbeam with the threaded portions of the through-holes.

7. A roll as set forth in claim 6, wherein the supply lines lead into angle connection pieces thereby defining a fluidic channel, so that the fluidic channel that they define leads to a location for each channel that lies along a common line of alignment and the supply lines run with a clearance radially outside of this line of alignment and the fluid channel undergoes a right angle bend just prior to connection with its respective angle connection piece.

8. A roll as set forth in claim 7, wherein the bend is provided by angle units.

9. A roll as set forth in claim 4, wherein the supply lines lead into angle connection pieces thereby defining a fluidic channel, so that the fluidic channel that they define leads to a location for each channel that lies along a common line of alignment and the supply lines run with a clearance radially outside of this line of alignment and the fluid channel undergoes a right angle bend just prior to connection with its respective angle connection piece.

10. A roll as set forth in claim 4, wherein the supply unit further comprises at least one holding disk which has bore holes for receiving the supply lines, the holding disk being joined to the carrier and extending transversely with respect to said carrier.

11. A roll as set forth in claim 1, wherein the supply lines are arranged along a divided circle whose center point is situated approximately in the center of the longitudinal recess.

12. A roll as set forth in claim 1, further comprising cover plates having bore holes for the supply lines, wherein the cover plates are provided at the ends of the longitudinal area of the crossbeam within which the plurality of supporting elements are arranged.

13. A roll as set forth in claim 12, further comprising cover plates having bore holes for the supply lines, wherein the cover plates are provided at the ends of the longitudinal area of the crossbeam within which the plurality of supporting elements are arranged.

14. A roll as set forth in claim 13, wherein the cover plates have connections for the feeding or removal of fluid medium into or out of the longitudinal recess within the crossbeam.

15. A roll as set forth in claim 14, wherein an additional radial channel runs to each supporting element from the longitudinal recess of the crossbeam.

\* \* \* \* \*

UNITED STATES PATENT AND TRADEMARK OFFICE
CERTIFICATE OF CORRECTION

PATENT No. :  5,919,121

DATED      :  July 6, 1999

INVENTOR(S):  Karl-Heinz KUSTERS

It is certified that error appears in the above-identified patent and that said Letters Patent is hereby corrected as shown below:

Column 5, line 38, change "N" to "M".

Signed and Sealed this

Sixth Day of June, 2000

Attest:

Q. TODD DICKINSON

*Attesting Officer*          *Director of Patents and Trademarks*